United States Patent [19]
Jackson

[11] Patent Number: 6,123,306
[45] Date of Patent: Sep. 26, 2000

[54] WHEELCHAIR CAMERA STAND

[76] Inventor: Fredrick L. Jackson, P.O. Box 854, Ceiba, Puerto Rico 00735

[21] Appl. No.: 09/184,882

[22] Filed: Nov. 3, 1998

[51] Int. Cl.$^7$ .............................. E04G 3/00; F16M 11/04; B62J 39/00
[52] U.S. Cl. .................................... 248/296.1; 248/187.1; 280/304.1
[58] Field of Search ................................ 248/518, 296.1, 248/125.8, 177.1, 187.1, 218.4; 280/304.1

[56] References Cited

U.S. PATENT DOCUMENTS

| | | | |
|---|---|---|---|
| 2,119,325 | 5/1938 | Goodhart | 248/118 |
| 2,591,051 | 4/1952 | Caldwell | 248/177.1 |
| 3,929,309 | 12/1975 | De Vore | 248/118 |
| 4,163,536 | 8/1979 | Heller et al. | 248/118 |
| 4,266,825 | 5/1981 | Le Donne . | |
| 4,878,685 | 11/1989 | Bahm . | |
| 4,913,393 | 4/1990 | Wood . | |
| 5,040,813 | 8/1991 | Cumbie . | |
| 5,228,711 | 7/1993 | Summers . | |
| 5,246,240 | 9/1993 | Romich et al. . | |
| 5,476,241 | 12/1995 | Helman . | |
| 5,497,214 | 3/1996 | Labree | 248/187.1 |
| 5,651,558 | 7/1997 | Boyce | 280/304.1 |

*Primary Examiner*—Ramon O. Ramirez
*Assistant Examiner*—Michael D. Nornberg
*Attorney, Agent, or Firm*—Richard C. Litman

[57] ABSTRACT

A camera stand for mounting a camera or the like to a wheelchair. The device includes a platform on which the camera is mounted, a stand disposed between the platform and the wheelchair, and structure for mounting the stand to the wheelchair. The platform may be any conventional camera platform similar to those used with a conventional camera tripod. The structure for mounting the stand to the wheelchair comprises at least one clamp, which may be any of a variety of clamps well known in the industry for connecting two tubular structures. The stand itself has four different embodiments for mounting to different types of wheelchairs, including stands adapted for mounting to a front rail, a steering column, an armrest, or a back support, depending on the model of the wheelchair. The stand has a height adjustment means for adjusting the height of the camera platform to suit individuals who sit higher or lower in the wheelchair, and includes a pair of telescoping tubes secured by a clamp. In the preferred embodiment, the platform is mounted on a hinged arm, the hinged arm being attached to the stand by means of a cylinder which telescopes and rotates on the top telescoping tube.

6 Claims, 5 Drawing Sheets

WHEELCHAIR CAMERA STAND

BACKGROUND OF THE INVENTION

1. Field of the Invention

The present invention relates to mounts for attachment of apparatus to wheelchairs, and more particularly to camera mounts or stands for wheelchairs.

2. Description of the Related Art

Many handicapped persons have illnesses or disabilities, such as paraplegia, multiple sclerosis, etc., which confine them to wheelchairs for mobility. Many different devices and apparatus have been proposed in order to assist the wheelchair bound individual to engage in a broader range of activities and hobbies than might otherwise be possible. A few of these devices are directed at particular activities, while most are directed to a diversified range of activities.

U.S. Pat. No. 4,266,825, issued May 12, 1981 to Robert LeDonne, discloses a plate having camera attaching means, the plate including four pivotally mounted legs having ball and socket joints at the other end of the legs, at least two legs having flat pads attached to the wheelchair arms by Velcro straps, the other two legs either having similar flat pads or spring clips for attachment to wheelchairs with short arms. U.S. Pat. No. 5,476,241, issued Dec. 19, 1995 to David L. Helman, teaches a Wheelchair Accessory Stand for rifles, cameras, and the like including two cross members permanently secured to side bars or front posts on the wheelchair, a rotatable vertical rod mounted on bushings on the cross member with a collar for height adjustment, a horizontal stand screwed onto the vertical rod, slidable base mounts on the horizontal stand, and pivoting adjustable brackets to receive the rifle, camera or other device mounted on the slidable base.

Mounts for attaching a variety of different utensils and equipment to wheelchairs include U.S. Pat. No. 5,040, 813, issued Aug. 20, 1991 to Carlyen F. Cumbie, and U.S. Pat. No. 5,246,240, issued Sep. 21, 1993 to Romich, et al. The Cumbie patent shows a base member mounting to the lower frame of the wheelchair, a support rod extending from the base, a latching means for supporting the support rod, the support rod being adapted for receiving a variety of utensils and apparatus, such as bowling balls, fishing rods, umbrellas, telephones, etc. The Romich patent describes a mount attached to the armrest having first and second rotating axles, the axles rotating by means of pulleys, the mount being suitable for communications devices, computers, etc.

Devices for mounting trays, baskets, and the like are disclosed in U.S. Pat. No. 4,878,685, issued Nov. 7, 1989 to Glenn A. Bahm, U.S. Pat. No. 4,913,393, issued Apr. 3, 1990 to Charles F. Wood, and U.S. Pat. No. 5,228,711, issued Jul. 20,1993 to Thomas T. Summers. The Bahm patent describes a pivotal mount for a work tray having two plates which clamp on opposite sides of a wheelchair arm, and locking means with a cam to lock the mount on the arm, and a tubular sleeve to receive the tray. The Wood patent teaches a mount attached horizontally and vertically to a wheelchair by nuts and bolts having a square shaped tube for receiving various stanchions supporting armrests, baskets, etc. The Summers patent shows a tray assembly with both horizontal and vertical support members, adjustable in both directions, the trays sliding on grooves.

Photography is a hobby which has attracted numerous enthusiastic and dedicated adherents. In addition to the intrinsic merits of the hobby, it offers a useful diversion to the handicapped person which can provide a much needed sense of accomplishment and achievement.

It is evident that most devices designed for attaching apparatus to a wheelchair have been designed to accommodate a variety of apparatus, rather than being specifically designed for supporting a particular device. The versatility of the devices is useful for general purposes, but has drawbacks when specifically applied to cameras. On these devices the mounting point is not specifically adapted for mounting a camera, hence it requires some degree of adaptation and adjustment to mount the camera on a general purpose wheelchair support. The general purpose supports or stands are more complex, bulkier, and are not designed with a view towards locking the stand in a rigid position while aiming or focusing a camera. On the other hand, the LeDonne device, although specifically designed for mounting a camera, has four telescoping legs disposed across both armrests, leaving the wheelchair occupant encumbered and restricted in his upper body movements while the tripod support is in place, and restricting his field of vision.

Hence, there is a need for a relatively simple stand particularly adapted to mounting a camera to a wheelchair which is less cumbersome to the wheelchair bound individual, and which maintains the camera in a relatively rigid position during aiming and focusing in order to overcome the limitations of the prior art.

None of the above inventions and patents, taken either singularly or in combination, is seen to describe the instant invention as claimed. Thus a wheelchair camera stand solving the aforementioned problems is desired.

SUMMARY OF THE INVENTION

The present invention is a camera stand for mounting a camera to a wheelchair. The device consists of a platform on which the camera is mounted, a stand disposed between the platform and the wheelchair, and means for mounting the stand to the wheelchair. The platform may be any conventional camera platform similar to those used with a conventional camera tripod and well known in the art. The means for mounting the stand to the wheelchair comprises at least one clamp, which may be any of a variety of clamps well known in the industry for connecting two tubular structures. The stand itself has four different embodiments for mounting to different types of wheelchairs, including stands adapted for mounting to a front rail, a steering column, an armrest, or a back support, depending on the model of the wheelchair. The stand has a height adjustment means for adjusting the height of the camera platform to suit individuals who sit higher or lower in the wheelchair, and includes a pair of telescoping tubes secured by a clamp. In the preferred embodiment, the platform is mounted on a hinged arm, the hinged arm being attached to the stand by means of a cylinder which telescopes and rotates on the top telescoping tube.

Accordingly, it is a principal object of the invention to provide a stand for a wheelchair specifically adapted for mounting and supporting a camera.

It is another object of the invention to provide a camera stand for mounting to a wheelchair which will maintain the camera in a fixed and rigid position during aiming and focusing of the camera.

It is a further object of the invention to provide a camera stand for mounting a camera to a wheelchair which will allow the wheelchair bound individual to remain as unencumbered as possible while the camera stand remains mounted to the wheelchair.

Still another object of the invention is to provide camera stands which are capable of mounting to different sites of a wheelchair to accommodate different styles and models of wheelchairs.

A further object of the invention is to provide a camera stand for mounting a camera to a wheelchair with a hinged and rotating arm for alternately rotating the camera into a convenient operating position in front of the user or rotating the camera to a less encumbered position when not in use.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

DESCRIPTION OF THE DRAWINGS

Similar reference characters denote corresponding features consistently throughout the attached drawings.

DETAILED DESCRIPTION OF THE PREFERRED EMBODIMENTS

The present invention is a camera stand adapted for mounting to a wheelchair, designated generally as 10 in FIGS. 1 through 4. Wheelchairs come in a great variety of styles and models. Some have full armrests, others have armrests which only extend about half the length of a full armrest. Some are battery powered and have a steering column mounted in the front of the wheelchair in a center position. Others do not have sufficient armrest or other conveniently accessible rails or tubing at the front of the chair, hence they require mounting of the camera stand 10 to the back support of the wheelchair. Consequently, FIGS. 1 through 5 show four different embodiments of the camera stand 10 according to the present invention, which vary in configuration depending on their point of attachment to the wheelchair.

Figure 1:
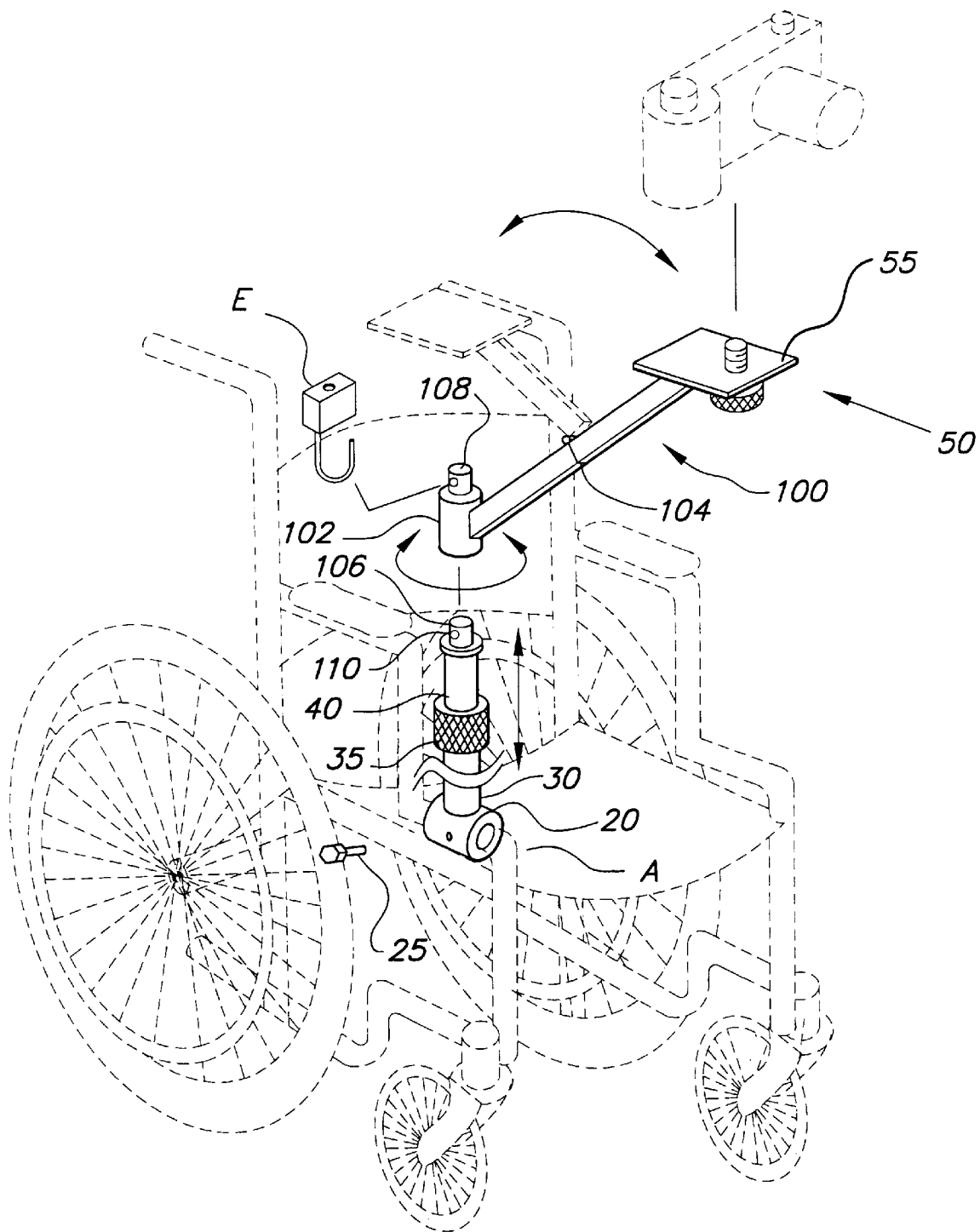
FIG. 1 is an environmental, elevational view of a preferred embodiment of a wheelchair camera stand adapted for attachment to the front rail of a wheelchair according to the present invention.

FIG. 1 shows an embodiment of the present invention adapted for attachment to a front rail A of the wheel chair. As shown, the camera stand 10 includes clamping means for attachment to the front rail A. The Figure reflects a clamp 20 secured to the rail A by a thumb screw 25. It will be understood that the clamping means may comprise any clamping means conventional in the industry for attaching two pieces of tubing. The clamping means may comprise, for example, band clamps secured by wing nuts, strap clamps, spring clamps, etc. The clamping means may have one end welded to or integral with the camera stand 10, or it may be a double-ended clamp with a connecting arm. In the latter case, the connecting arm may have a pivoting means for varying the angle of the camera stand 10 with respect to the front rail A, such as a two piece clamp with one piece threadably inserted in the other and secured by a wing nut abutting one of the two pieces. The clamping means may comprise either one or two clamps 20, depending on the length of front rail A accessible to the camera stand 10.

The camera stand 10 includes a base section 30 of tubing and a top section 40 of tubing which telescopes into the base section 30. The camera stand 10 further includes a height adjustment means, comprising a threadable clamp or locking ring 35 at the junction of the base section 30 and the top section 40. The height adjustment means is of the type well known in the art and operates similarly to the height adjustment means in a microphone stand, for example. When the threadable clamp 35 is unscrewed, the height of the stand 10 may be adjusted over a given range, preferably three inches, by moving the top section 40 up or down as desired and retightening the clamp 35.

The camera stand 10 further includes a camera attachment means for attaching a camera to the camera stand 10. As shown in the Figures, the camera attachment means is a standard head 50 of conventional construction as is well known in the photographic art. Such heads are normally attached to a tripod and are available from photographic supply houses as separate items. The head 50 shown in the Figures is a standard pan head, although a ball head may also be used. The head 50 includes a platform 55 adapted for receiving a camera. The head 50 may be integral with the camera stand 10 or the top section 40 of the stand 10 may simply be adapted for receiving various heads 50 which are commercially available.

The top section 40 and the base section 30 of the camera stand 10 are made from aluminum or other light weight metal alloy tubing, or alternatively, they may be made from a rigid, light weight, synthetic polymer such as poly (vinyl chloride) or polybutylene.

In the preferred embodiment, the camera head 50 is mounted to the camera stand 10 by means of a hinged arm 100 having a cylindrical base 102, the base 102 being hollow and having a diameter slightly greater than the diameter of the top section of the top section 40 of the camera stand 10 in order to telescope onto the top section 40 and in order to rotate around the top section 40. The cylindrical base 102 allows the wheelchair occupant to rotate the camera platform 55 in front of the seat in order to use the camera, or to swing the camera stand to the side of the wheelchair when not in use. Similarly, a hinge 104 mounted approximately halfway along the length of the arm 100 permits the user to pivot bend the arm 100 to move the camera platform 55 closer to or farther from the chair for convenience in use. The hinged arm 100 is preferably a square. solid rod. Optionally, the top section 40 may have a stud 106 projecting vertically from the top of the tube 40 extending through an 108 aperture defined in the top of the cylindrical base 102, the stud 106 having a bore 110 defined transversely through the stud 106, the bore 110 being adapted to receive the hasp of a lock E, the structure being adapted to secure the hinged arm 100 to the camera stand 10.

Figure 2:
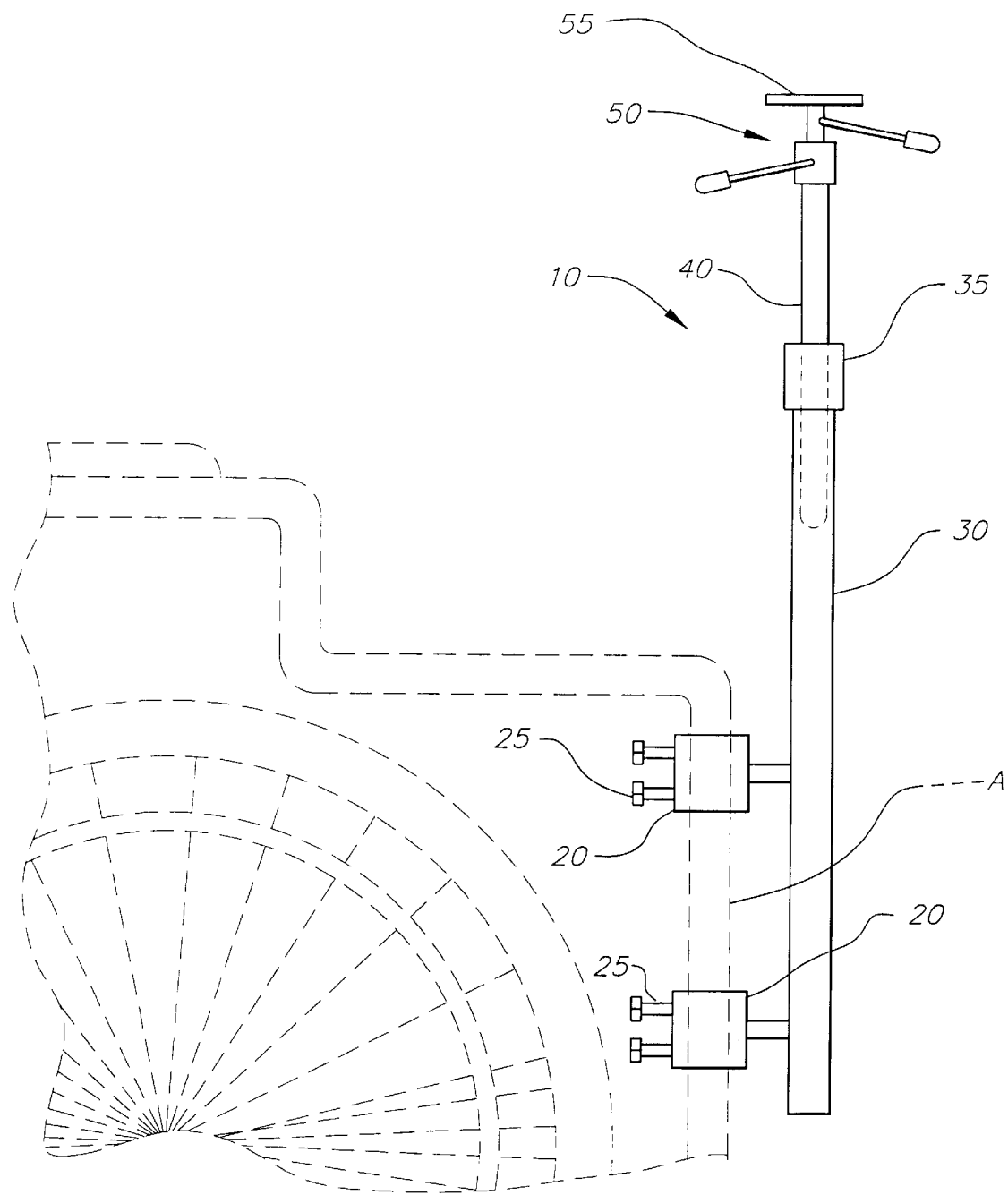
FIG. 2 is an environmental, elevational view of an alternative embodiment of chair camera stand adapted for attachment to the front rail wheelchair according to the present invention.

FIG. 2 shows an alternative embodiment of the present invention adapted for attachment to a front rail A of the wheel chair, in which the camera platform 55 is mounted in a fixed position, except for height adjustment. As shown, the camera stand 10 includes clamping means for attachment to the front rail A. The Figure reflects a clamp 20 secured to the rail A by a pair of thumb screws 25.

As with the embodiment shown in FIG. 1, the camera stand 10 includes a base section 30 of tubing and a top section 40 of tubing which telescopes into the base section 30. The camera stand 10 further includes a height adjustment means, comprising a threadable clamp or locking ring 35 at the junction of the base section 30 and the top section 40.

The camera stand 10 further includes a camera attachment means 50 for attaching a camera to the camera stand 10.

Figure 3:
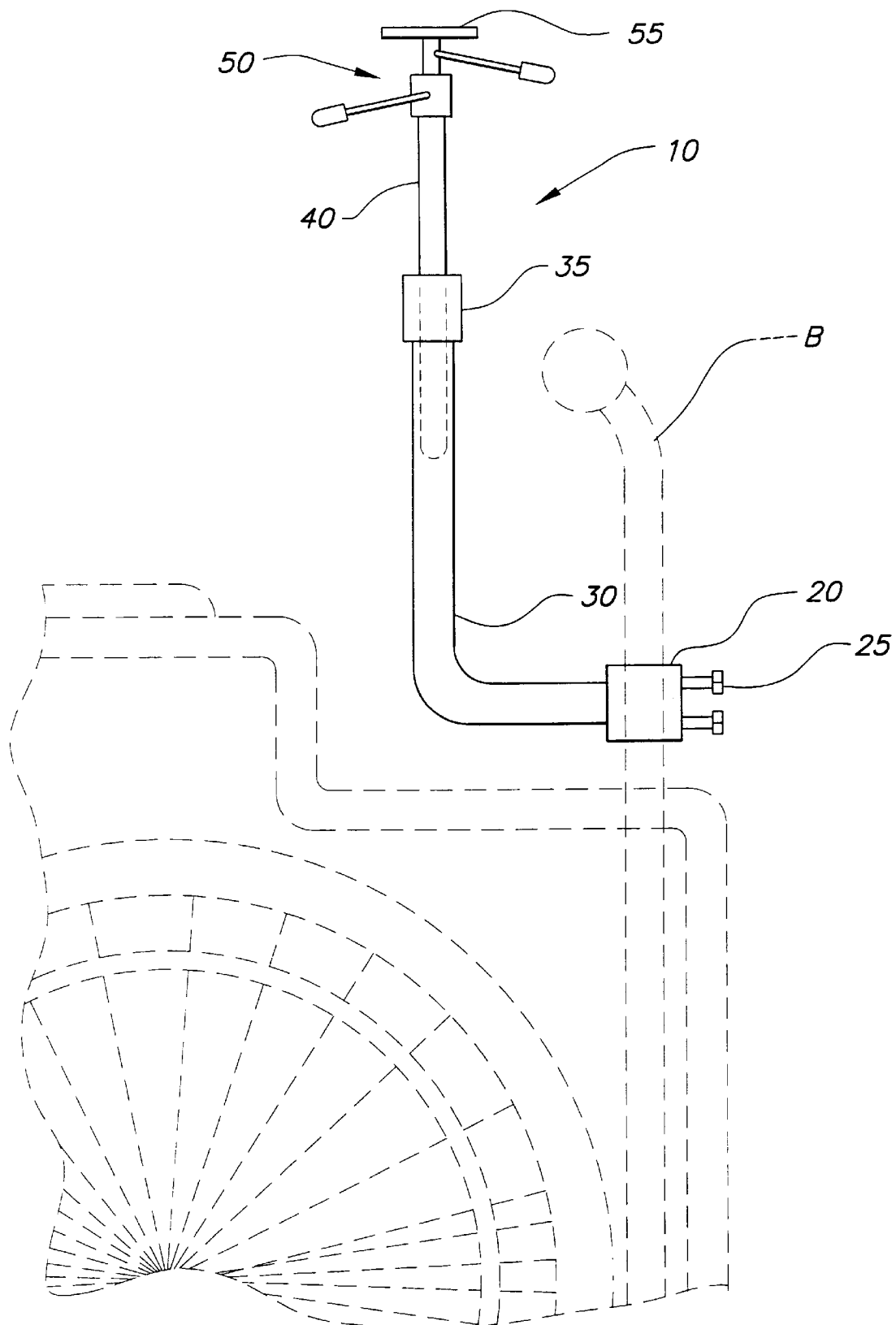
FIG. 3 is an environmental, elevational view of a wheelchair camera stand adapted for attachment to the steering column of a wheelchair according to the present invention.
Figure 4:
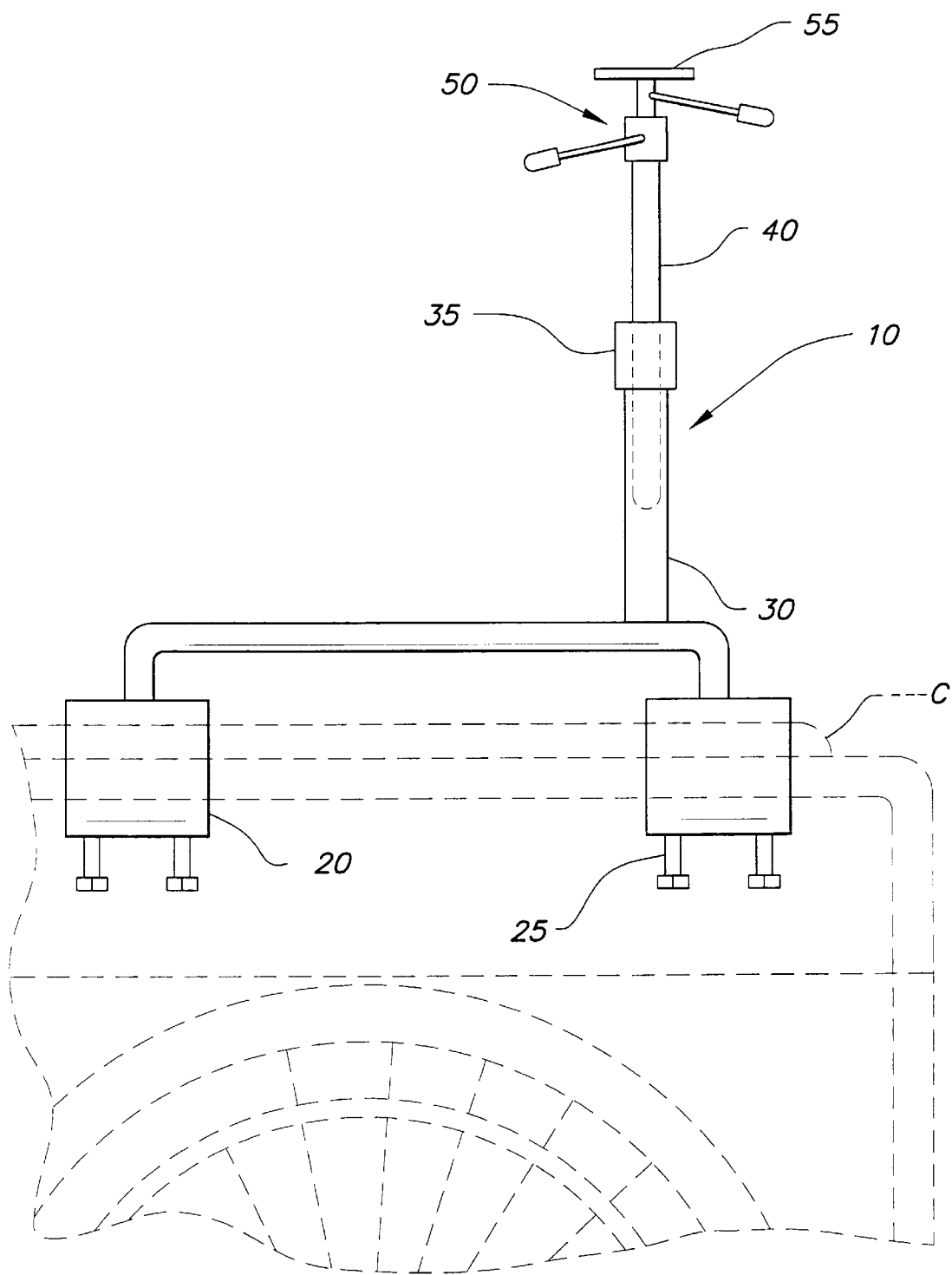
FIG. 4 is an environmental, elevational view of a wheelchair camera stand adapted for attachment to the armrest of a wheelchair according to the present invention.
Figure 5:
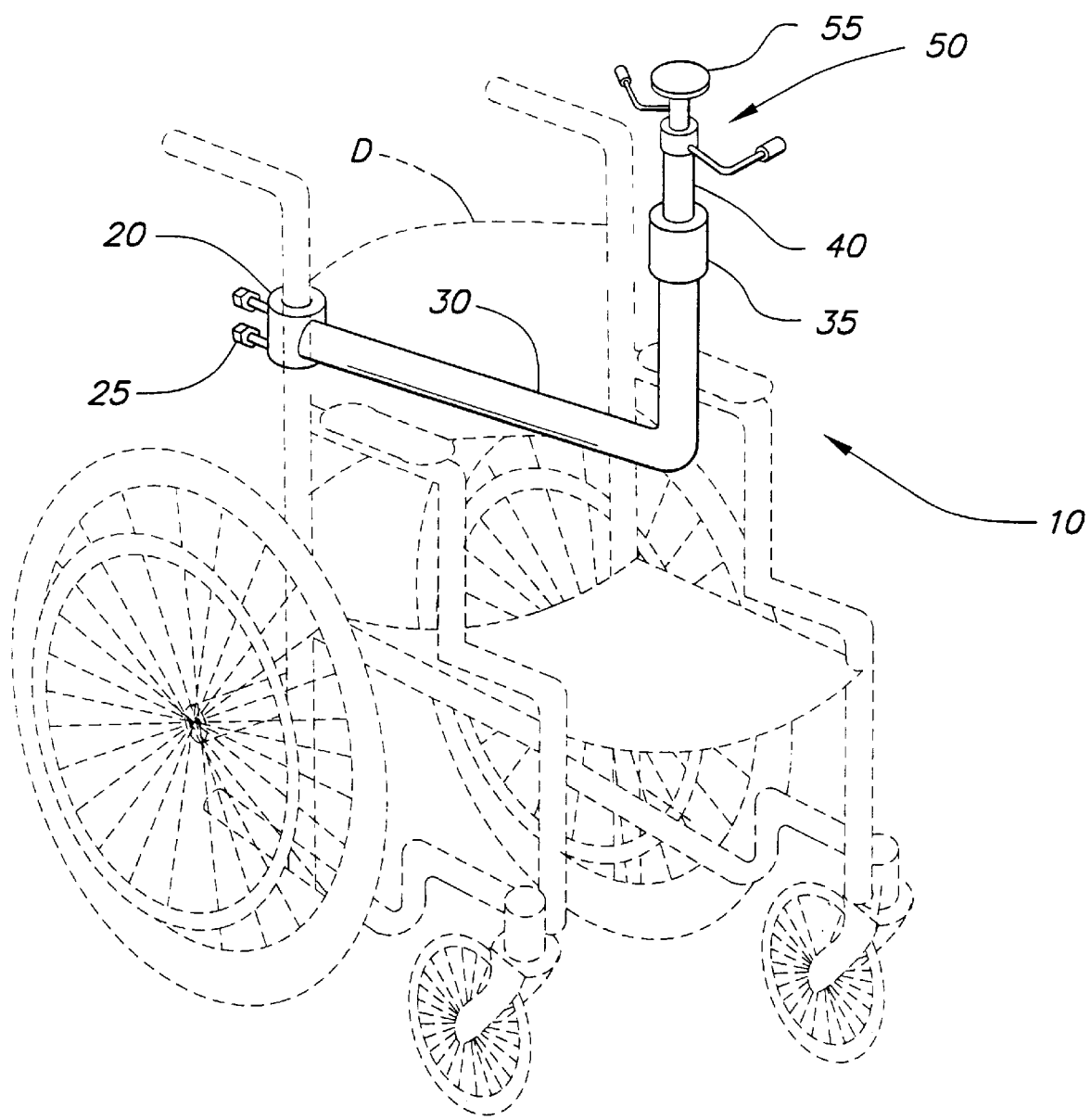
FIG. 5 is an environmental, perspective view of a wheelchair camera stand adapted for attachment to the back support of a wheelchair according to the present invention.

FIGS. 3, 4, and 5 show alternative embodiments of the camera stand 10. FIG. 3 shows an embodiment adapted for attachment to the steering column B of a motorized wheelchair. Whereas the stand 10 shown in FIG. 2 is shaped substantially in a straight line, the base section 30 in this embodiment extends horizontally from its point of attachment to the steering column B before bending to form a substantially right angle extending vertically upwards towards the eye level of the wheelchair occupant, substantially defining an L-shape. The shape of the stand 10 brings the camera platform 55 within comfortable reach of the user. Although a single clamp 20 is shown in FIG. 3, the stand 10 may also be made with a bifurcated base section 30 in order to connect the stand 10 to the steering column with two clamps 20.

FIG. 4 shows an alternative embodiment adapted for attachment to a wheelchair armrest C, primarily intended for wheelchairs having a full armrest C. As shown, the base section 30 is bifurcated so that one clamp 20 attaches to the armrest C adjacent the back support D, while the other clamp 20 is attached near the free end of the same armrest C. The clamping means 20 shown in the Figure is secured by thumbscrews 25, although it will be understood that a strap type clamp may be used, which may be secured with a hook and loop type fastener, particularly where the armrests C are upholstered.

FIG. 5 shows an embodiment in which the camera stand 10 is adapted for attachment to the back support D of the wheelchair. The clamp 20 is attached to the back support D in any conveniently available position, preferable near the elbow level of the wheelchair occupant. The base section 30 extends horizontally towards the front of the chair, bending at substantially a right angle to extend vertically upwards towards the eye level of the user, substantially defining a recumbent L-shape.

Although FIGS. 3, 4, and 5 show the platform 55 in a fixed position, except for height adjustment, it will be understood that it is preferable that these embodiments also be equipped with the rotating hinged arm 100 shown in FIG. 1, the arm 100 being mounted on the upper telescoping tube 40 in each embodiment.

The camera stand 10 of the present invention is light enough that it may be manipulated and installed by the handicapped individual confined to a wheelchair without assistance if he has use of his upper extremities, with the possible exception of the embodiment adapted for attachment to the back support D. It will be apparent from the description of the various embodiments of the camera stand 10 that the present invention provides a support for attachment of a camera the wheelchair which leaves the wheelchair occupant relatively unencumbered so he is free to manipulate other objects while the stand 10 is attached to the wheelchair. It will also be apparent that the camera stand 10 may be used either with a still photograph camera or with a video recorder camera.

It is to be understood that the present invention is not limited to the embodiments described above, but encompasses any and all embodiments within the scope of the following claims.

What is claimed is:

1. A wheelchair camera stand for attachment to a wheelchair having a front rail, a steering column, an armrest, or a back support, comprising:

a) a substantially vertical tubular top section;
   b) a tubular base section connected to said top section;
   c) means for telescopically interfitting said top section into said base section;
   d) means for attaching a camera to said top section, said camera attachment means comprising a head having a camera platform adapted for receiving a camera;
   e) clamping means for clamping the base section of the camera stand to a wheelchair;
   f) height adjustment means for adjusting the height of said camera attachment means relative to the eye level of a wheelchair occupant, said height adjustment means comprising a threadable clamp for clamping said top section to said base section; and
   (g) a hinged arm having a cylindrical base, the cylindrical base having a slightly treater diameter than said top section in order to telescope onto and rotate about said top section, said head being mounted on the hinged arm, the hinged arm having a hinge mounted approximately halfway along the length of the arm for pivoting the arm in order to adjust the position of the camera platform.

2. The wheelchair camera stand according to claim 1, wherein said base section is substantially vertical, said base section and said clamping means being adapted for clamping said base section of said camera stand to a front rail of the wheelchair.

3. The wheelchair camera stand according to claim 1, wherein said base section is substantially L-shaped, said base section and said clamping means being adapted for clamping said base section to the steering column of the wheelchair.

4. The wheelchair camera stand according to claim 1, wherein said base section is substantially vertical and wherein said base section is bifurcated at the end clamped to a wheelchair armrest, said base section and said clamping means being adapted for clamping said base section to the armrest of the wheelchair.

5. The wheelchair camera stand according to claim 1, wherein said base section is substantially a recumbent L-shape, said base section and said clamping means being adapted for clamping said base section to the back support of the wheelchair.

6. The wheelchair camera stand according to claim 1, wherein said top section has a stud projecting vertically from the top of said top section and wherein the cylindrical base of said hinged arm has an aperture defined therein, the stud extending through the aperture, the stud having a bore defined transversely through the stud for receiving the hasp of a lock, in order to lock said hinged arm to said camera stand.

* * * * *